United States Patent
Tong et al.

(10) Patent No.: US 10,359,742 B2
(45) Date of Patent: Jul. 23, 2019

(54) LEARNING MODEL CONSTRUCTION DEVICE, AND CONTROL INFORMATION OPTIMIZATION DEVICE

(71) Applicant: FANUC CORPORATION, Yamanashi (JP)

(72) Inventors: Zheng Tong, Yamanashi (JP); Takuma Nishimura, Yamanashi (JP); Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 15/882,052

(22) Filed: Jan. 29, 2018

(65) Prior Publication Data

US 2018/0224808 A1    Aug. 9, 2018

(30) Foreign Application Priority Data

Feb. 3, 2017  (JP) .................................. 2017-018898

(51) Int. Cl.
| | |
|---|---|
| *G05B 13/02* | (2006.01) |
| *G06N 20/00* | (2019.01) |
| *G05B 19/418* | (2006.01) |
| *G05B 17/02* | (2006.01) |

(52) U.S. Cl.
CPC ........... *G05B 13/027* (2013.01); *G05B 17/02* (2013.01); *G05B 19/4183* (2013.01); *G05B 19/41855* (2013.01); *G05B 19/41885* (2013.01); *G06N 20/00* (2019.01)

(58) Field of Classification Search
CPC ..................................................... G05B 13/02
See application file for complete search history.

(56) References Cited

FOREIGN PATENT DOCUMENTS

| | | |
|---|---|---|
| JP | 09-091025 | 4/1997 |
| JP | 2000-271836 | 10/2000 |
| JP | 2003-5836 | 1/2003 |
| JP | 2015-103168 | 6/2015 |
| JP | 2016-024583 | 2/2016 |
| JP | 5969676 | 8/2016 |
| JP | 6063016 | 1/2017 |
| JP | 2018-106379 | 7/2018 |
| JP | 2018-120453 | 8/2018 |

*Primary Examiner* — Tejal Gami
(74) *Attorney, Agent, or Firm* — Wenderoth, Lind & Ponack, L.L.P.

(57) ABSTRACT

A learning model is constructed for adjusting control information so that a cycle time becomes shorter while also avoiding the occurrence of overheating. A learning model construction device includes:

an input data acquisition means that acquires, as input data, control information including a combination of an operation pattern of a spindle and parameters related to machining in a machine tool, and temperature information of the spindle prior to performing the machining based on the control information;

a label acquisition means for acquiring temperature information of the spindle after having performed the machining based on the control information as a label; and a learning model construction means for constructing a learning model for temperature information of the spindle after having performed machining based on the control information, by performing supervised learning with a group of the input data and the label as training data.

6 Claims, 5 Drawing Sheets

FIG. 4

LEARNING MODEL CONSTRUCTION DEVICE, AND CONTROL INFORMATION OPTIMIZATION DEVICE

This application is based on and claims the benefit of priority from Japanese Patent Application No. 2017-018898, filed on 3 Feb. 2017, the content of which is incorporated herein by reference.

BACKGROUND OF THE INVENTION

Field of the Invention

The present invention relates to a learning model construction device that constructs a learning model for control information for controlling a machine tool or the like, and a control information optimization device that optimizes control information using the constructed learning model.

Related Art

In order to improve the productivity from machine tools, it is necessary to reduce the cycle time, which is the machining time for machining a work. As a method for a reduction in cycle time, for example, it has been considered raise the cutting feedrate of the machine tool, and lowering the time constant of acceleration/deceleration of the spindle or feed shaft equipped to the machine tool.

However, when raising the cutting feedrate, or lowering the time constant of acceleration/deceleration of the spindle or feed shaft, the load on the drive device of each shaft consisting of a motor and amplifier increases. As a result thereof, the drive device may generate heat and overheat, and cause damage to the drive device and/or a malfunction.

In order to prevent such situations, the general technology configures to announce an alarm and stop operation of the drive unit if the temperature of the drive device rises due to heat generation up to immediately before overheating. It is thereby possible to prevent the drive device from being damaged or the like by the drive device overheating. However, a problem arises in that machining is interrupted due to not being able to restart while temporarily stopping the running of the drive device until the drive device is cooled and the temperature drops.

Considering this problem, the technology disclosed in Patent Document 1 causes the operating speed of the drive unit to decline by adjusting the control information (e.g., information including operation pattern of spindle, parameters, etc.) set in the numerical control device, without causing the drive unit to immediately stop, in the case of the temperature of the drive device rising up to a predetermined temperature due to heat generation. If configuring in this way, it is possible to run the drive unit and continue machining, while preventing a further rise in the temperature of the drive device.

Patent Document 1:
Japanese Unexamined Patent Application, Publication No. 2003-5835

SUMMARY OF THE INVENTION

As mentioned above, if using the technology disclosed in. Patent Document 1, even in a case of there being a possibility of the drive device overheating, the machining can be continued by adjusting the control information. It is thereby possible to avoid the occurrence of overheating.

However, if further considering the length of the cycle time and not just overheating, the control information adjusted in accordance with Patent Document 1 will not necessarily be optimal control information. For example, expecting a rise in temperature without causing the speed of the drive device to decline after raising up to a predetermined temperature as in Patent Document 1, the way in which performing machining at the appropriate speed such that the temperature does not rise up to the predetermined temperature also has the possibility of halving a short cycle time as a result. In addition, the way in which appropriately carrying out be dwelling to cause the drive device to standby for a predetermined time prior to the temperature rising also has the possibility of having a short cycle time as a result.

However, the technology disclosed in Patent Document 1 is ultimately technology for performing a countermeasure in the case of the temperature rising, and is not technology for adjusting the control information so as to become optimal control information with a short cycle time while also avoiding the occurrence of overheating, and then performing machining. Therefore, in the case of employing the technology disclosed in Patent Document 1, there is concern over the productivity of machine tools declining.

Therefore, the present invention has an object of providing a learning model construction device that constructs a learning model for adjusting control information so that the cycle time becomes shorter while also avoiding the occurrence of overheating, and a control information optimization device for adjusting the control information using this constructed learning model.

A learning model construction device (e.g., the learning model construction device 300 described later) according to a first aspect of the present invention includes: an input data acquisition means (e.g., the input data acquisition unit 310 described later) that acquires, as input data, control information including a combination of an operation pattern of a spindle and parameters related to machining in a machine tool (e.g., the machine tool 100 described later), and temperature information of the spindle prior to performing the machining based on the control information; a label acquisition means (e.g., the label acquisition unit 320 described later) for acquiring temperature information of the spindle after having performed the machining based on the control information as a label; and a learning model construction means (e.g., the learning unit 330 described later) for constructing a learning model for temperature information of the spindle after having performed machining based on the control information, by performing supervised learning with a group of the input data and the label as training data.

According to a second aspect of the present invention, the learning model construction device as described in the first aspect maybe configured so that the control information includes an operation pattern for either one or both of a cutting feedrate and a dwell for which making the spindle standby for a designated time, as the operation pattern of the spindle.

According to a third aspect of the present invention, the learning model construction device as described in the first or second aspect may be configured so that the control information includes a parameter for either one or both of time constant of acceleration/deceleration and a speed override for cutting feed, as the parameter.

A control information optimization device (e.g., the control information optimization device 400 described later) according to a fourth aspect of the present invention is a control information optimization device that employs the learning model constructed by the learning model construction device as described in any one of the first to third aspects, the control information optimization device including: an optimal adjustment information selection means (e.g., the optimal adjustment information selection unit 410 described later) for selecting optimal adjustment information from among sets of adjustment information for adjusting the control information, based on the learning model constructed by the learning model construction device, in which the optimal adjustment information is adjustment information for which overheating will not occur in a case of adjusting the control information according to the optimal adjustment information and performing the machining, and for which a cycle time in a case of adjusting the control information according to the optimal adjustment information and performing the machining is shorter than a cycle time in a case of adjusting the control information according to adjustment information other than the optimal adjustment information and performing the machining.

According to a fifth aspect of the present invention, the control information optimization device as described in the fourth aspect may be configured so that the optimal adjustment information selection means selects the optimal adjustment information by performing a simulation based on the learning model constructed by the learning model construction device, without actually performing machining by way of a machine tool.

According to a sixth aspect of the present invention, the control information optimization device as described in the fourth or fifth aspect may be configured so that the optimal adjustment information selection means:
obtains a first set which is a set of post-adjustment control information adjusted by a plurality of the adjustment information, respectively; obtains a second set which is a set of post-adjustment control information for which overheating will not occur in a case of performing the machining, from among the post-adjustment control information in the first set; obtains a third set which is a set of post-adjustment control information satisfying a predetermined temperature condition in a case of performing continuous running of the machining, from among the second set; and selects post-adjustment control information having the shortest cycle time in a case of performing the machining from among the third set, and selects adjustment information corresponding to the post adjustment control information thus selected as the optimal adjustment information.

According to a seventh aspect of the present invention, the control information optimization device as described in the fourth or fifth aspect may be configured so that the optimal adjustment information selection means considers that the temperature information of the spindle prior to performing a subsequent machining will change by performing the machining according to post-adjustment control information that was adjusted according to the optimal adjustment information, and repeats processing of: obtaining a first set which is a set of post-adjustment control information adjusted by a plurality of the adjustment information, respectively; obtaining a second set which is a set of post-adjustment control information for which overheating will not occur in a case of performing the machining, from among the post-adjustment control information in the first set; and selecting post-adjustment control information having the shortest cycle time in a case of performing the machining from among the third set, and selects adjustment information corresponding to the post-adjustment control information thus selected as the optimal adjustment information.

According to an eighth aspect of the present invention, the control information optimization device as described in any one of the fourth to sixth aspects may be configured so as to further include an optimal adjustment information output means (e.g., the optimal adjustment information output unit 420 described later) for outputting the optimal adjustment information, in order to adjust the control information according to the optimal adjustment information, and perform the machining.

According to a first perspective of the present invention, it becomes possible to construct a learning model for adjusting the control information so that the cycle time becomes shorter, while also avoiding the occurrence of overheating, in addition, according to the second perspective of the present invention, it becomes possible to adjust the control information using this constructed learning model.

DETAILED DESCRIPTION OF THE INVENTION

Next, a first embodiment and a second embodiment of the present invention will be explained in detail by referencing the drawings. The first embodiment and second embodiment of the present invention share basic configurations and operations; however, the selection methods of adjustment information described later are different. Hereinafter, as an explanation of the first embodiment, an explanation will be made for the basic configurations and operations shared in the respective embodiments, and the selection method of adjustment information in the first embodiment. Next, as an explanation of the second embodiment, redundant explanations for the basic configurations and operations shared in the respective embodiments will be omitted, and an explanation will be made for the selection method of adjustment information in the second embodiment.

First Embodiment

Figure 1:
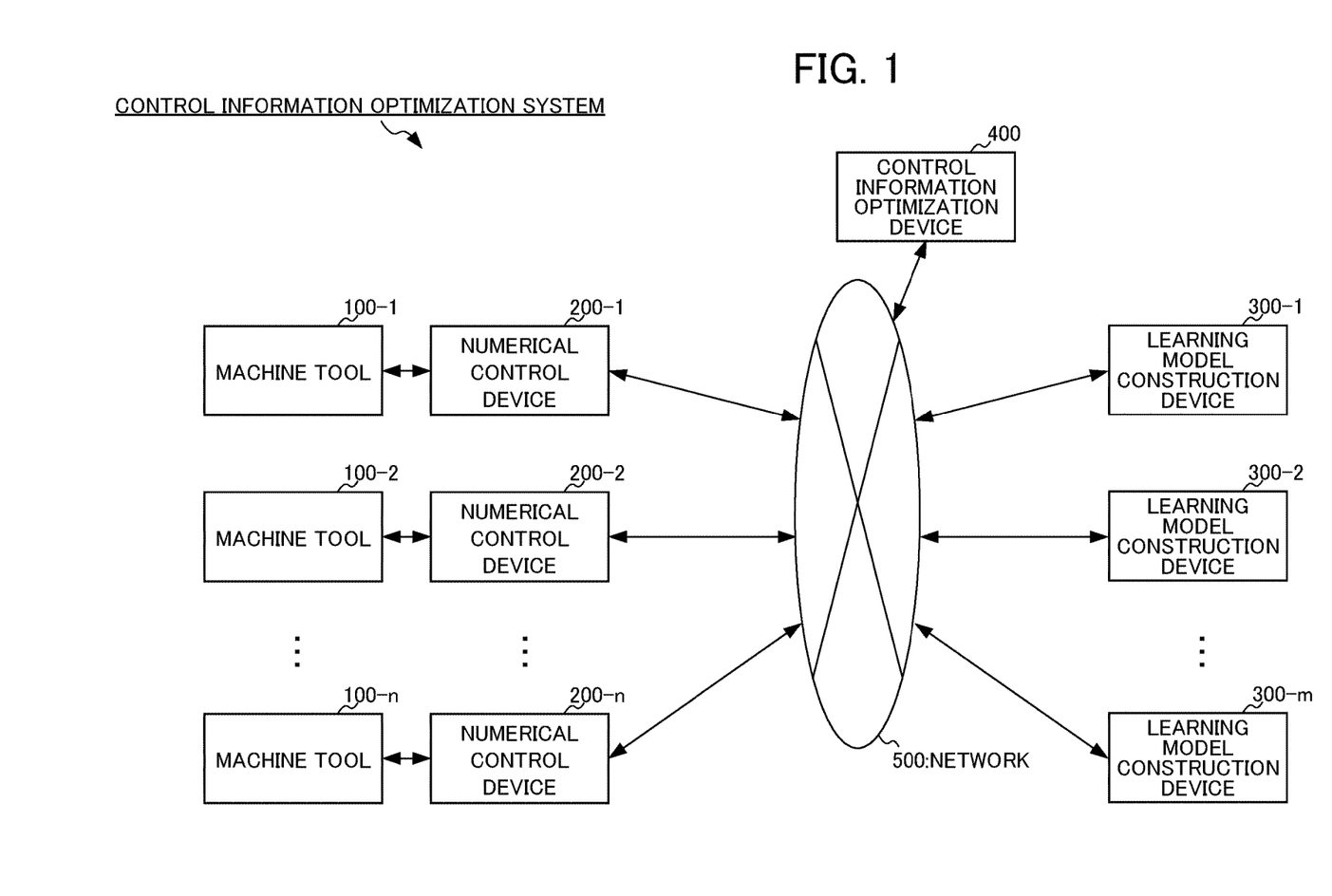
FIG. 1 is a block diagram showing a basic configuration of an overall embodiment of the present invention.

First, the configuration of a control information optimization system 1 according to the present embodiment will be explained. The control information optimization system 1 includes n-number of machine tools 100, n-number of numerical control devices 200, m-number of learning model construction devices, a control information optimization device 400 and a network 500, as shown in FIG. 1. It should be noted that n and m are any natural numbers.

Herein, the numerical control device 200 and machine tool 100 are established in one-to-one groups, and are connected to be communicable. The numerical control device 200 and machine tool 100 may be connected via a connection interface, and may be connected via a network such as a LAN (Local Area Network). A plurality of groups of this group of the numerical control device 200 and machine tool 100 may be installed in the same factory, or may be installed in respectively different factories, for example.

In addition, the numerical control device 200, a learning model construction device 300 and control information optimization device 400 are respectively connected directly via a connection interface, or respectively connected via the network 500, to be able to mutually perform communication. It should be noted that the network 500, for example, is a LAN constructed within a factory, Internet, public telephone network, or a combination of these. The specific communication system of the network 500, whether being a wired connection or wireless connection, etc., is not particularly limited.

Figure 2:
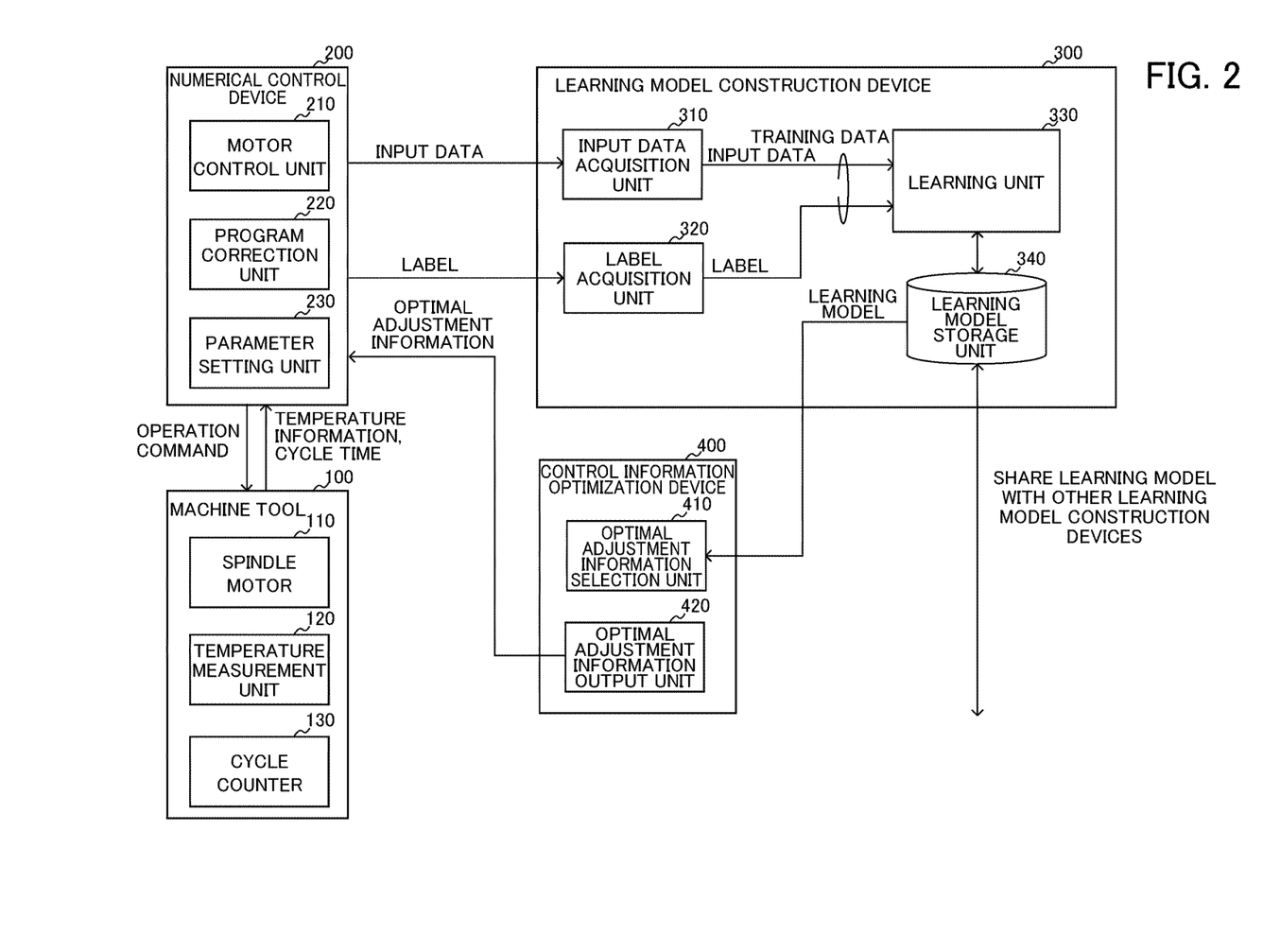
FIG. 2 is a block diagram showing functional blocks equipped to each device included in the embodiment of the present invention.

Next, the functions of these devices included in the control information learning system 1 will be explained by referencing FIG. 2. Herein, FIG. 2 is a block diagram representing the functional blocks included in each device. It should be noted that, since the respective numerical control devices 200 have equivalent functions, only one thereof is illustrated in FIG. 2. Similarly, since each of the machine tools 100 and each of the learning model construction devices 300 also have equivalent functions, respectively, only one thereof is illustrated in FIG. 2. In addition, the network 500 existing between each device is omitted from illustration.

The machine tool 100 is a machine tool that performs predetermined machining such as cutting work based on operation commands outputted by the numerical control device 200. The machine tool 100 includes a spindle motor 110, temperature measurement unit 120 and cycle counter 130.

The spindle motor 110 is a spindle motor for performing cutting work. A cutting tool (omitted from illustration) for cutting work is installed to the spindle motor 110, and cutting work is performed by the spindle (omitted from illustration) rotating by the spindle motor 110, and a feed shaft (omitted from illustration) which feeds this spindle.

The temperature measurement unit 120 is a temperature sensor that measures the temperature of the spindle motor 110. The temperature measured by the temperature measurement unit 120 is outputted to the numerical control device 200 as temperature information (value indicating spindle temperature or value indicating the rise amount in spindle temperature). It should be noted that the temperature measurement unit 120 may be built into the spindle motor 110, and may be installed in the vicinity of the spindle motor 110.

In the case of the machine tool 100 performing predetermined cutting work, the cycle counter 130 is a counter for counting the cycle time, which is the machining time required in this cutting work. The cycle time counted by the cycle counter 130 is outputted to the numerical control device 200.

The numerical control device 200 is a device causing predetermined machining such as cutting work to be performed by the machine tool 100, by controlling the machine tool 100. In addition, the numerical control device 200 also has a function of sending input data and labels for performing machine learning to the learning model construction device 300. An explanation will be made for the details of the input data and labels, together with the explanation of functional blocks of the learning model construction device 300 described later.

The numerical control device 200 includes a motor control unit. 210, parameter setting unit 220, and program correction unit 230.

The motor control unit. 210 generates an operation command based on the control information, and controls the driving of the spindle motor 110, etc. of the machine tool 100, by sending the generated operation command to the machine tool 100. The cutting work is thereby realized by the machine tool 100.

Herein, control information is information including the machining program set in the numerical control device 200, and the values of parameters set in the numerical control device 200. In the machining program included in the control information, for example, the operation pattern for performing cutting work such as the revolution speed of the spindle, cutting feedrate, cutting time, and dwell causing to standby for a designated time in the state as is, are written. In addition, in the values of parameters included in the control information, for example, the time constant of acceleration/deceleration and the values of parameters related to override are included.

The program correction unit 220 is a portion that directly corrects the machining program included in the control information based on the adjustment information. More specifically, the program correction unit 220 directly corrects the program code, such as the cutting feedrate, dwell, etc. written in this machining program, based on the adjustment information inputted from the user, and the optimal adjustment information outputted from the control information optimization device 400.

The parameter setting unit. 230 is a portion that sets the values of parameters included in the control information, based on the adjustment information. More specifically, the parameter setting unit 230 sets the values of these parameters, based on the adjustment information inputted from the user, and optimal adjustment information outputted from the control information optimization device 400.

Although the functional blocks of the machine tool 100 and numerical control device 200 have been explained above, the aforementioned functional blocks are portions particularly related to the operations of the present embodiment. The machine tool 100 and numerical control device 200 include common functional blocks in addition to the aforementioned functional blocks. For example, a servomotor for causing the workpiece to move, a control unit for controlling the servomotor, a position/speed detector for performing position/speed feedback control, a motor drive amplifier that amplifies the operation command, a control panel for receiving manipulations of the user, etc. are included as functional blocks. However, since these common functional blocks are well known to those skilled in the art, detailed explanations and illustrations will be omitted.

The learning model construction device 300 is a device that constructs a learning model for the temperature of the spindle motor 110 after the machine tool 100 has performed machining such as cutting work, by performing supervised learning, which is machine learning using training data. This learning model is used for the control information optimization device 400 described later to select adjustment information such that the machining cycle time becomes the shortest, while also avoiding the occurrence of overheating.

In order to construct such a learning model, the learning model construction device 300 includes an input data acquisition unit 310, label acquisition unit 320, learning unit 330 and learning model storage unit 340.

The input data acquisition unit 310 is a portion that acquires input data from the numerical control device 200, and outputs the acquired input data to the learning unit 330. Herein, control information set in the numerical control device 200 and temperature information of the spindle motor 110 prior to the machine tool 100 performing machining according to the operation command based on this control information are included in the input data.

The label acquisition unit 320 is a portion that acquires labels from the numerical control device 200, and outputs the acquired labels to the learning unit 330. Herein, temperature information of the spindle motor 110 after the machine tool 100 performs machining according to the operation command based on the control information included in the input data is included in the label.

The learning unit 330 accepts a group of this input data and label as training data, and using this training data, constructs the learning model for the temperature of the spindle model 110 after performing machining, by performing supervised learning. It should be noted that more detailed contents of supervised learning by the learning unit 330 will be described later by referencing FIG. 4.

Herein, it is desirable for several sets of training data for performing supervised learning to be prepared. Therefore, for example, it may be configured so as to acquire training data from each of the numerical control devices 200 actually operating in a client's factory or the like. Since the client uses various adjustment information to adjust the control information in the client's factory or the like, it is possible to acquire various training data.

In addition, in order to efficiently perform learning by way of the learning model construction device 300, for example, it may be configured so as to acquire many sets of training data by causing the machine tool 100 to operate while adjusting the control information using various adjustment information in a laboratory or the like. In this case, the creation of adjustment information may be performed by the user; however, it may be configured so as to automatically create adjustment information by a device such as the numerical control device 200, and operate in accordance with this adjustment information that was created automatically.

For example, in the case of the temperature of the spindle motor 110 being low after the machine tool 100 performed machining, it is good to configure so that the numerical control device 200 automatically creates adjustment information such that the load increases but the cycle time shortens, by increasing the cutting feedrate incrementally, decreasing the time constant incrementally, or the like. On the other hand, if the temperature of the spindle motor 110 is high after the machine tool 100 performed machining, it is good to configure so that a device such as the numerical control device 200 automatically creates adjustment information such that the cycle time lengthens, but the load becomes smaller, such as by reducing the cutting feedrate incrementally, increasing the time constant incrementally, or the like.

The learning model constructed by the learning unit 330 is outputted to the learning model storage unit 340 and the control information optimization device 400 described later.

The learning model storage unit 340 is a storage unit that stores the learning model constructed by the learning unit 330. The learning model stored by the learning model storage unit 340 is used by the control information optimization device 400 described later.

It should be noted that, after constructing the learning model, in the case of acquiring new training data, it may be configured so as to update the learning model once constructed, by further performing supervised learning on the learning model stored by the learning model storage unit 340.

In addition, it may be configured so as to share the learning models stored by the learning model storage unit 340 between other learning model construction devices 300. If configuring so as to share the learning models with a plurality of learning model construction devices 300, since it becomes possible to perform supervised learning by distributing to each of the learning model construction devices 300, it is possible to improve the efficiency of supervised learning.

The control information optimization device 400 is a device that selects the adjustment information such that the machining cycle time becomes the shortest, while also avoiding the occurrence of overheating. The control information optimization device 400 includes an optimal adjustment information selection unit 410 and an optimal adjustment information output unit 420.

The optimal adjustment information selection unit 410 acquires learning models stored by the learning model storage unit 340. This learning model is a learning model constructed by the learning unit 330 performing supervised learning as mentioned above. Then, the optimal adjustment information selection unit 410 selects the adjustment information such that the machining cycle time becomes the shortest (hereinafter referred to as "optimal adjustment information"), while also avoiding the occurrence of overheating, by performing simulation using this learning model. The specific selection methods of the optimal adjustment information will be described later while referencing the flowcharts of FIGS. 4 and 5.

The optimal adjustment information output unit 420 is a portion that outputs the optimal adjustment information selected by the optimal adjustment information selection unit 410. The optimal adjustment information output unit 420 outputs the optimal adjustment information to the numerical control device 200. Then, the numerical control device 200 corrects the machining program, and/or sets the values of parameters, included in the control information set in this numerical control device 200, based on this optimal adjustment information. In addition, the numerical control device 200 creates an operation command based on this corrected program and/or values of parameters set. Then, by the numerical control device 200 controlling the driving of the machine tool 100 according to this operation command, the machine tool 100 can operate so that this machining cycle time becomes the shortest, while also avoiding the occurrence of overheating.

It should be noted that the optimal adjustment information output unit 420 may output the optimal adjustment information to a device other than the numerical control device 200, may record the optimal adjustment information on a recording medium, or may display the optimal adjustment information on a screen.

The functional blocks included in the numerical control device 200, learning model construction device 300, and control information optimization device 400 have been explained above.

In order to realize these functional blocks, each of the numerical control device 200, learning model construction device 300, and control information optimization device 400 includes an arithmetic processing unit such as a CPU (Central Processing Unit). In addition, each of the numerical control device 200, learning model construction device 300, and control information optimization device 400 also includes an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in each of the numerical control device 200, learning model construction device 300, and control information optimization device 400, the arithmetic processing unit reads out the application software and/or OS from the auxiliary storage device, and performs arithmetic processing based on this application software and/or OS, while expanding the read application software and/or OS in the main storage device. In addition, based on these computation results, the various hardware possessed by the respective devices are controlled. The functional blocks of the present embodiment are thereby realized. In other words, the present embodiment can be realized by hardware and software cooperating.

As a specific example, the numerical control device 200 can be realized by combining application software for realizing the present embodiment with a common numerical control device. In addition, the learning model construction device 300 and/or control information optimization device 400 can be realized by combining application software for realizing the present embodiment with a general personal computer.

However, since the computation amount increases accompanying supervised learning for the learning model construction device 300, it is good to make so that high-speed processing is possible when configuring to install GPUs (Graphics Processing Units) to a personal computer, and using the GPUs in the arithmetic processing accompanying supervised learning, according to a technique called GPGPU (General-Purpose computing on Graphics Processing Units). Furthermore, in order to perform higher-speed processing, it may be configured to construct a computer cluster using a plurality of computers equipped with such GPUs, and perform parallel processing with the plurality of computers included in this computer cluster.

Figure 3:
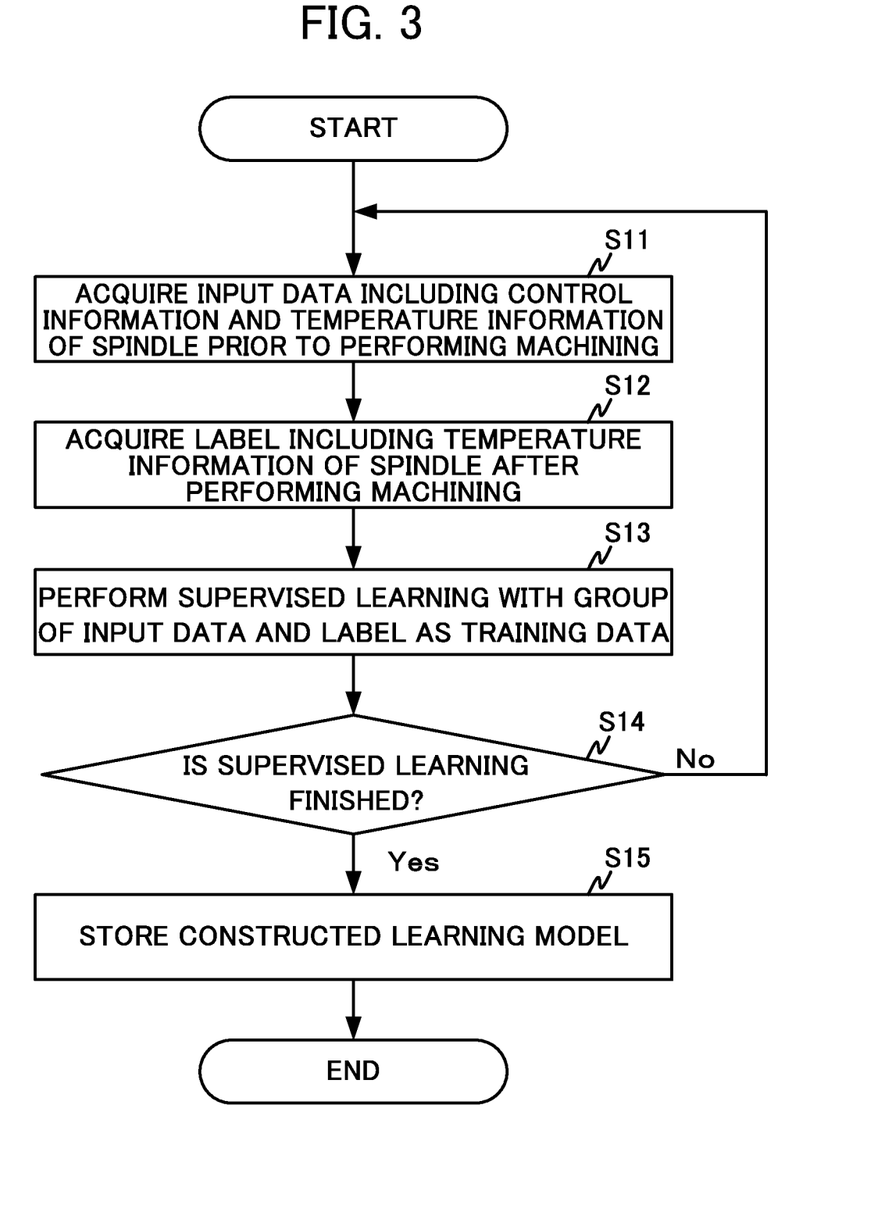
FIG. 3 is a flowchart showing basic operations during supervised learning in the embodiment of the present invention.

Next, an explanation will be made for operations during supervised learning by the learning model construction device 300 by referencing the flowchart of FIG. 3.

In Step S11, the input data acquisition unit 310 acquires from the numerical control device 200 input data including the control information set in the numerical control device 200, and temperature information of the spindle motor 110 prior to the machine tool 100 performing machining according to the operation command based on this control information.

In Step S12, the label acquisition unit 320 acquires from the numerical control device 200 a label including temperature information of the spindle motor 110 after the machine tool 100 performed machining according to the operation command based on the control information included in the input data.

In Step S13, the learning unit 330 performs supervised learning with the group of input data acquired in Step S11 and the label acquired in Step S12 as the training data. In the present embodiment, supervised learning is performed by a neural network constituted by joining perceptrons. More specifically, a group of input data and a label included in the training data is provided to a neural network, and weighting for each perceptron included in the neural network is varied so that the output of the neural network becomes the same as the label. By configuring in this way, the characteristics of the training data are learned, and a learning model for estimating a result from the input is recursively obtained.

In Step S14, the learning unit 330 determines to end supervised learning, or to repeat supervised learning (Step S14). Herein, it is possible to arbitrarily decide the conditions to end supervised learning. For example, it is good to configure so as to end supervised learning in the case of the value of the error between the output of the neural network and label becomes no more than a predetermined value. In addition, alternatively, it is good to configure so as to end supervised learning in the case of having repeated supervised learning by only the number of times decided in advance.

In any case, if the condition is not satisfied, and supervised learning is still not ended (NO in Step S14), the processing returns to Step S11, and repeats supervised learning again with new training data or the same training data as the target.

On the other hand, in the course of repeating supervised learning, if the condition to end supervised learning is satisfied (YES in Step S14), the supervised learning is ended. Then, in Step S15, the learning model constructed according to supervised learning up until this moment is outputted and stored in the learning model storage unit 240.

According to the above explained operations, the learning model construction device 300 exerts an effect in being able to construct a learning model for the temperature of the spindle motor 110 after the machine tool 100 performed machining such as cutting work.

In addition, the aforementioned supervised learning may be performed by on-line learning, may be performed by batch learning, or may be performed by mini-batch learning. On-line learning is a learning method of performing supervised learning immediately every time machining is performed by the machine tool 100, and training data is created. In addition, batch learning is a learning method which, while machining is performed by the machine tool 100, and training data is repeatedly created, collects a plurality of sets of training data in response to the repetition, and performs supervised learning using all of the collecting training data. Furthermore, mini-batch learning is a learning method between on-line learning and batch learning of performing supervised learning each time a certain amount of training data accumulates.

Figure 4:
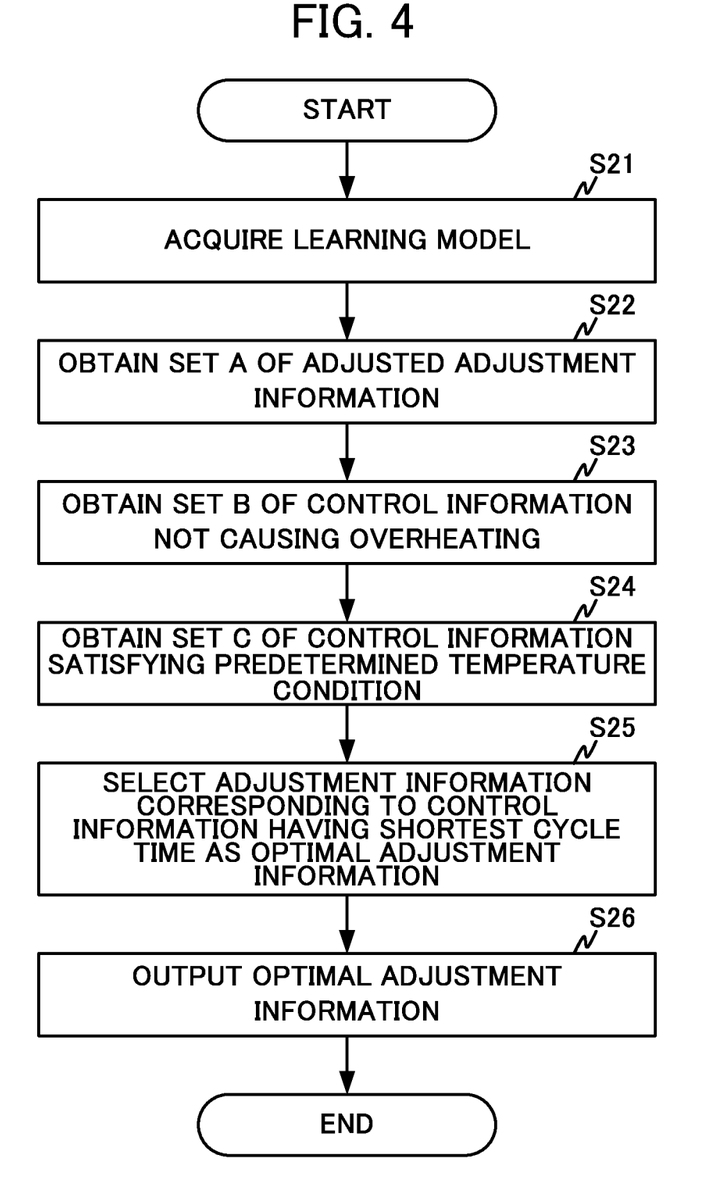
FIG. 4 is a flowchart showing basic operations during selection of optimal adjustment information in a first embodiment of the present invention.

Next, an explanation will be made for operation of the control information optimization device 400 by referencing the flowchart of FIG. 4. This is an operation that is for selecting optimal adjustment information such that, in the case of being able to adjust a certain set of control information with various adjustment information, can avoid the occurrence of overheating even if continuously running for a long period of time, and the machining cycle time becomes the shortest.

In Step S21, the optimal adjustment information selection unit 410 acquires a learning model stored by the learning model storage unit 340. This learning model is the product of updating by the learning unit 330 performing supervised learning as mentioned above.

In Step S22, the optimal adjustment information selection unit 410 obtains a Set A consisting of adjusted control information c obtained by adjusting the respective plurality of adjustment information.

In Step S23, the optimal adjustment information selection unit 410 obtains a Set B consisting of a set of control information $c \in A$ satisfying the condition of "no overheating", among the control information $c \in A$ belonging to Set A.

For this reason, the optimal adjustment information selection unit 410 inputs a combination of control information c∈A and temperature information prior to machining of the spindle motor 110 to the learning model as input data. Then, it is determined whether or not overheating will occur in the case of performing the machining corresponding to this input data, according to the temperature based on the temperature information after machining of the spindle motor 110, which is the output corresponding to this input data. Then, in the case of overheating not occurring, the control information c∈A included in this input data is set as a source (element) of Set B. On the other hand, in the case of overheating occurring, the control information c∈A included in this input data is not set as a source (element) of Set B. The optimal adjustment information selection unit 410 obtains Set B by performing determination in this way on all of the control information c∈A belonging to Set A.

In Step S24, Set C consisting of a set of control information c∈B satisfying a predetermined temperature condition is obtained among the respective control information c∈B belonging to Set B. Herein, predetermined temperature condition is the matter of the rise in temperature not exceeding a permitted temperature $T_{max}$ in the case of consecutively performing machining according to control information c∈B.

In addition, the input data related to the learning model is a group of the temperature prior to machining of the spindle motor 110 and the control information c∈B, and since the output corresponding to this input data is the temperature of the spindle motor 110 after performing machining according to the control information c∈B, the function F corresponding to the learning model can be defined as follows.

F(temperature prior to machining,adjusted control information)=temperature after machining Then, in the case of substituting $T_0$ as the temperature prior to machining, c∈B as the control information c∈B, N as the number of times executing machining, and the number N being a sufficiently large number into the function F, it becomes $$T_1 = F(T_0, c \in B)$$
$$T_2 = F(T_1, c \in B)$$
$$...$$
$$T_{i+1} = F(T_i, c \in B)$$
$$...$$
$$T_N = F(T_{N-1}, c \in B)$$

and it is possible to calculate the temperature $T_N$ of the spindle motor 110 after consecutively performing machining N times. Herein, if $T_N$ calculated by actually performing simulation by actually using the learning model does not exceed the permitted temperature $T_{max}$, it can be determined that the predetermined temperature condition was satisfied. Then, the control information c∈B satisfying the predetermined temperature condition is established as a source (element) of Set C. On the other hand, control information c∈B not satisfying the predetermined temperature condition is not established as a source (element) of Set C. The optimal adjustment information selection unit 410 obtains Set C by performing determination for all of the control information c∈B belonging to Set E.

In Step S25, the optimal adjustment information selection unit 410 selects the control information c∈C having the shortest cycle time in the case of performing machining with this control information c∈C, from among the control information c∈C belonging to Set C. Then, the adjustment information correspond to the selected control information c∈C (i.e. adjustment information for adjusting the control information c prior to adjustment to the selected control information c∈C) is selected as the optimal adjustment information. Herein, cycle time can be estimated based on the contents of the control information c∈C thereof. In addition, it may be configured so as to use the cycle time measured by the cycle counter 130 of the machine tool 100 upon actually performing machining based on the contents of this control information c∈C, without estimating.

In Step S26, the optimal adjustment information output unit 420 outputs the optimal adjustment information selected by the optimal adjustment information selection unit 410. When this is done, the numerical control device 200 corrects the machining program set in the numerical control device 200, and/or sets the values of parameters, based on this optimal adjustment information. In addition, the numerical control device 200 generates an operation command based on this corrected program and/or the values of parameters set. Then, it exerts an effect in that the machine tool 100 can continuously run such that this machining cycle time becomes the shortest while also avoiding the occurrence of overheating, by the numerical control device 200 controlling the driving of the machine tool 100 according to this operation command.

An explanation for the first embodiment has been made above. An explanation for the second embodiment will be made next. It should be noted that, since each of the embodiments share basic configurations and operations as mentioned at the beginning of the explanation of the embodiments, redundant explanations for these points will be omitted. On the other hand, since the selection method for the adjustment information by the optimal adjustment information selection unit 410 differs between the respective embodiments, a detailed explanation will be made for this point.

Second Embodiment

In the first embodiment, in the case of being able to adjust a certain set of control information with various adjustment information as mentioned above by referencing the flowchart of FIG. 4, optimal adjustment information is selected such that it is possible to avoid the occurrence of overheating even when continuously running for a long period of time, and the machining cycle time becomes the shortest. In contrast, with the present embodiment, in the case of being able to adjust one certain set of control information with various adjustment information as mentioned below by referencing the flowchart of FIG. 5, optimal adjustment information is selected such that it is possible to avoid the occurrence of overheating every time the machine tool 100 performs machining according to the operation command based on the adjusted control information, and the machining cycle time becomes the shortest.

Figure 5:
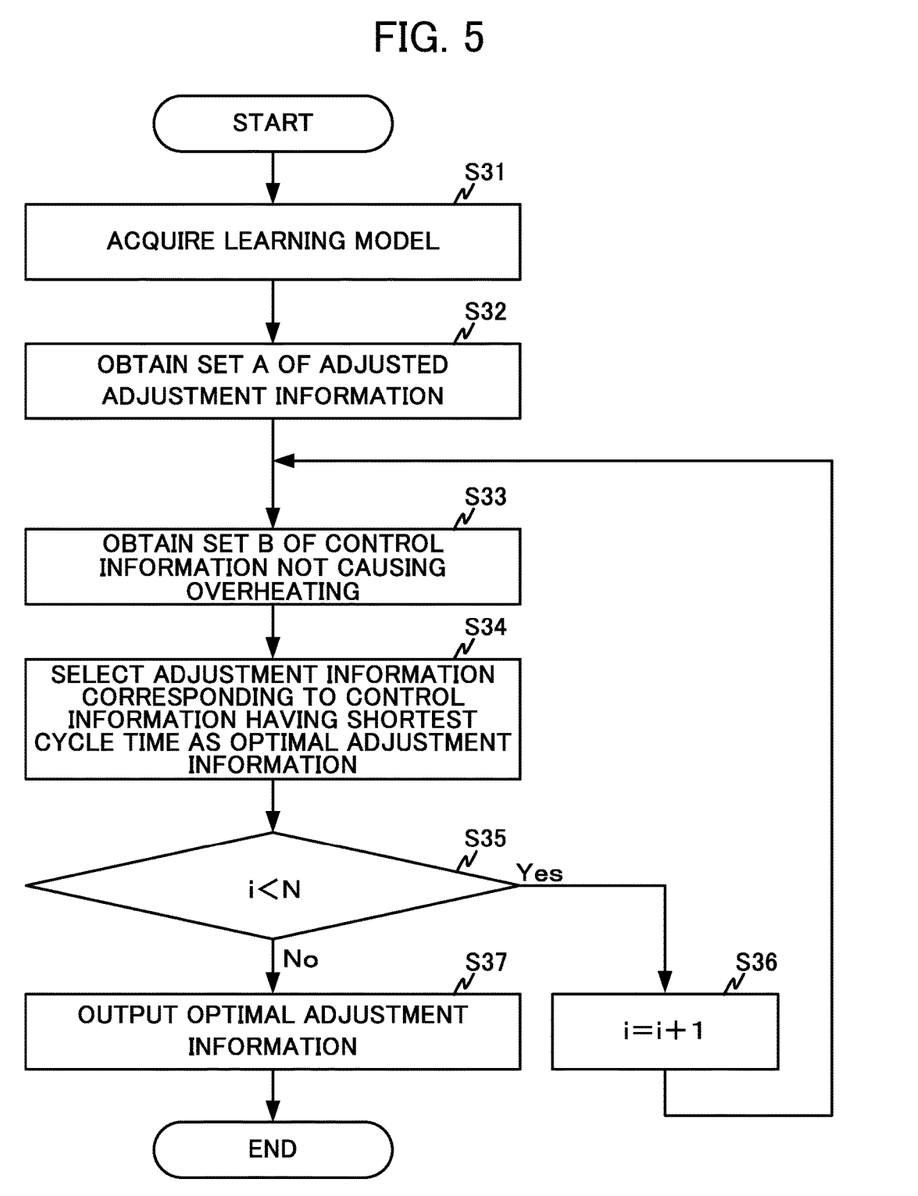
FIG. 5 is a flowchart showing basic operations during selection of optimal adjustment information in a second embodiment of the present invention.

In Step S31, the optimal adjustment information selection unit 410 acquires a learning model stored by the learning model storage unit 340. This learning model is the product of updating by the learning unit 330 performing supervised learning as mentioned above.

In Step S32, the optimal adjustment information selection unit 410 obtains Set A consisting of control information c after adjustment obtained by adjusting the respective plurality of adjustment information.

In Step S33, the optimal adjustment information selection unit 410 obtains Set B consisting of control information c∈A which satisfies the condition of "not overheating", among the control information c∈A belonging to Set A.

For this reason, the optimal adjustment information selection unit 410 inputs the group of control information c∈A and temperature information prior to machining of the spindle motor 110 to the learning model as input data. Then, it is determined whether or not overheating will occur in the case of performing the machining corresponding to this input data, according to the temperature based on the temperature information after machining of the spindle motor 110, which is the output corresponding to this input data. Then, in the case of overheating not occurring, the control information c included in this input data is set as a source (element) of Set B. On the other hand, in the case of overheating occurring, the control information c included in this input data is not set as a source (element) of Set B.

The optimal adjustment information selection unit 410 obtains Set B by performing determination in this way on all of the control information c∈A belonging to Set A.

In Step S34, the optimal adjustment information selection unit 410 selects the control information c∈B having the shortest cycle time in the case of performing machining with this control information c∈B, from the control information c∈B belonging to Set B. Then, the adjustment information corresponding to the selected control information c∈B (i.e. adjustment information for adjusting the pre-adjustment control information c to the selected control information c∈B) as the optimal adjustment information. Herein, the cycle time can be estimated based on the contents of this control information c∈B. In addition, it may be configured so as to use the cycle time measured by the cycle counter 130 of the machine tool 100 upon actually performing machining based on the contents of this control information c∈B, without estimating.

By performing processing up to the aforementioned Step S33, the optimal adjustment information for the control information used in the initial machining (defined as control information $c_0$) is selected. Next, in order to perform selection of the optimal adjustment information for the control information used in the next machining (defined as control information $c_1$), after performing machining using the control information $c_0$, the processing of Step S33 and Step S34 is performed again. In this case, since machining is performed using the control information $c_0$, the temperature of the spindle motor 110 changes. In other words, when expressed using the function F similarly to the first embodiment, by performing machining using the control information $c_0$ so as to be $$T_1 = F(T_0, c_0 \in B),$$

the temperature of the spindle motor 110 changes from $T_0$, which is the temperature prior to performing machining using the control information $c_0$, to $T_1$.

Then, in the determination of whether it will overheat in Step S33 the second time, determination is performed with the temperature of the spindle motor 110 as $T_1$. For this reason, the control information $c_1 \in B_1$ belonging to set B is assumed to be information differing from the control information $c_0 \in B_0$ according to the determination. Therefore, the optimal control information for the control information $c_1$ selected in the next Step S34 is also assumed to become information differing from the optimal control information for control information $c_0$.

In the same way, in order to perform selection of optimal adjustment information for the control information used in the next machining (defined as control information c2), the processing of Step S33 and Step S34 is performed again. In this case, since machining is performed using the control information $c_1$, the temperature of the spindle motor 110 changes further. In other words, when expressed using the function F similarly to the first embodiment, by performing the machining using the control information $c_1$ so as to be $$T_2 = F(T_1, c_1 \in B),$$

the temperature of the spindle motor 11 changes from $T_1$ to $T_2$. Therefore, the optimal control information for the control information $c_2$ is also assumed to become information differing from the optimal control information for the control information $c_1$.

By configuring in this way, the optimal control information for subsequent machining is selected whenever machining, based on the temperature of the spindle motor 110 which changes upon every machining. The present embodiment configures so as to obtain the optimal adjustment information over machining N times.

For this reason, the processing of Step S33 and Step S34 is repeated N times. More specifically, it is determined whether the aforementioned processing of Step S32 and Step S33 has been repeated N times as control information $c_i$ ($0 \le i \le N$). If not performing the processing of Step S32 and Step S33 N times (NO in Step S35), after increasing the value of i by 1 in Step S36, the processing returns to Step S33. Then, when repeating Step S33 and Step S34 N times in this way (YES in Step S35), the processing advances to Step S37.

In Step S37, the optimal adjustment information output unit 420 outputs the set of optimal adjustment information $\{c_0, \ldots, c_N\}$ selected for each of the control information $c_0$, control information $c_1$, ..., control information $c_N$ by the optimal adjustment information output unit 420.

The numerical control device 200 corrects the machining program, and sets the values of parameters set in this numerical control device 200, based on this set of optimal adjustment information $\{c_0, \ldots, c_N\}$. In addition, the numerical control device 200 generates an operation command based on this corrected program and values of parameters set. Then, the numerical control device 200 controls driving of the machine tool 100, according to this operation command. The machining will thereby be performed according to the operation command based on the control information $c_0$, the machining will be performed according to the operation command based on the next control information $c_1$, . . . , and the machining will be performed according to the operation command based on the final control information $c_N$. It thereby exerts an effect in that the machine tool 100 can operate so that the respective machining cycle times become the shortest, while also avoiding the occurrence of overheating.

Next, the effects of each embodiment of the present invention will be explained in further detail. As a premise, it is possible to shorten the cycle time by adjusting the machining program to raise the cutting feedrate. On the other hand, it is possible to suppress the heat generation of the spindle by lowering the cutting feedrate. In addition, it is possible to shorten the cycle time by adjusting the machining program to shorten the dwell. On the other hand, it is possible to suppress heat generation of the spindle by lengthening the dwell. Furthermore, it is possible to shorten the cycle time by adjusting the setting values of parameters to shorten the time constant of acceleration/deceleration. On the other hand, it is possible to suppress heat generation of the spindle by lengthening the time constant of acceleration/deceleration.

In this way, shortening of the cycle time and heat generation in the spindle are often in a trade-off relationship. In this regard, conventionally, the user has set the adjustment information believed by himself/herself to be optimum, based on his/her own experience. However, this adjustment information is not necessarily optimal, and the degree of perfection also differs depending on the user. In other words, conventionally, it has been difficult to shorten the cycle time while also avoiding the occurrence of overheating, by appropriately adjusting the machining program and/or values of parameters.

In contrast, with the respective embodiments of the present invention, it is possible to shorten the cycle time while also avoiding the occurrence of overheating, due to being able to select the optimal adjustment information in the aforementioned way, and adjusting the machining program and/or values of parameters according to this optimal adjustment information. In addition, with the respective embodiments of the present invention, due to being able to select the optimal adjustment information by way of simulation using the constructed learning model, it is not necessary to actually perform machining with the machine tool 100 in order to select the optimal adjustment information. In other words, the present embodiment exerts an advantageous effect compared to the common technology.

It should be noted that each of the respective devices included in the above-mentioned control information optimization system can be realized by hardware, software, or a combination of these. In addition, the control information learning method performed by cooperation of each of the respective devices included in the above-mentioned control information learning system can also be realized by hardware, software, or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber or a wireless communication path.

In addition, each of the aforementioned embodiments is a preferred embodiment of the present invention; however, it is not to limit the scope of the present invention to only the above-mentioned embodiments, and implementation is possible in modes achieved by combining the respective embodiments, or modes achieved by conducting various modifications in a scope not departing from the gist of the present invention.

Each of the aforementioned embodiments gives an example of a machine tool that performs cutting work as the machine tool 100; however, it is not limited thereto. For example, a machine tool that performs other machining such as grinding, polishing, rolling or forging may be established as the machine tool 100.

In addition, with each of the aforementioned embodiments, the learning model is constructed by way of supervised learning; however, it may be configured so as to construct the learning model by way of other machine learning such as semi-supervised learning.

Each of the aforementioned embodiments assumes that the learning model construction device 300 and control information optimization device 400 are realized by devices separate from the machine tool 100 and numerical control device 200; however, it may be configured so as to realize part or the entirety of the functions of the learning model construction device 300 and/or control information optimization device 400 by the machine tool 100 and/or numerical control device 200. In addition, it may be configured so as to realize both the functions of the learning model construction device 300 and control information optimization device 400 by a singular device.

EXPLANATION OF REFERENCE NUMERALS 100 machine tool
110 spindle motor
120 temperature measurement unit
130 cycle counter
200 numerical control device
210 motor control unit
220 parameter setting unit
300 learning model construction device
310 input data acquisition unit
320 control information output unit
330 learning unit
340 learning model storage unit
400 control information optimization device
410 optimal adjustment information selection unit
420 optimal adjustment information output unit
500 network

What is claimed is:

1. A learning model construction device comprising:
an input data acquisition means that acquires, as input data, control information including a combination of an operation pattern of a drive device of a spindle and parameters related to machining in a machine tool, and temperature information of the spindle prior to performing the machining based on the control information, which is a combination of an operation pattern including at least any of revolution speed of the drive device of the spindle, cutting feedrate, cutting time, and a dwell for which making the drive device of the spindle standby for a designated time, and a parameter including at least any of a time constant of acceleration/deceleration, and a cutting federate override;
a label acquisition means for acquiring temperature information of the drive device of the spindle after having performed the machining based on the control information as a label; and
a learning model construction means for constructing a learning model for temperature information of the drive device of the spindle after having performed machining based on the control information, by performing supervised learning with a group of the input data and the label as training data.

2. A control information optimization device that employs the learning model constructed by the learning model construction device according to claim 1, the control information optimization device comprising:
an optimal adjustment information selection means for selecting optimal adjustment information from among sets of adjustment information for adjusting the control information, based on the learning model constructed by the learning model construction device, wherein the optimal adjustment information is adjustment information for which overheating will not occur in the drive device of the spindle in a case of adjusting the control information according to the optimal adjustment information and performing the machining, and for which a cycle time in a case of adjusting the control information according to the optimal adjustment information and performing the machining is shorter than a cycle time in a case of adjusting the control information according to adjustment information other than the optimal adjustment information and performing the machining.

3. The control information optimization device according to claim 2, wherein the optimal adjustment information selection means selects the optimal adjustment information by performing a simulation based on the learning model constructed by the learning model construction device, without actually performing machining by way of a machine tool.

4. The control information optimization device according to claim 2, wherein the optimal adjustment information selection means:

obtains a first set which is a set of post-adjustment control information adjusted by a plurality of the adjustment information, respectively;

obtains a second set which is a set of post-adjustment control information for which overheating will not occur in the drive device of the spindle in a case of performing the machining, from among the post-adjustment control information in the first set;

obtains a third set which is a set of post-adjustment control information satisfying a predetermined temperature condition in a case of performing continuous running of the machining, from among the second set; and selects post-adjustment control information having the shortest cycle time in a case of performing the machining from among the third set, and selects adjustment information corresponding to the post-adjustment control information thus selected as the optimal adjustment information.

5. The control information optimization device according to claim 2, wherein the optimal adjustment information selection means considers that the temperature information of the drive device of the spindle prior to performing a subsequent machining will change by performing the machining according to post-adjustment control information that was adjusted according to the optimal adjustment information, and repeats processing of:

obtaining a first set which is a set of post-adjustment control information adjusted by a plurality of the adjustment information, respectively;

obtaining a second set which is a set of post-adjustment control information for which overheating will not occur in the drive device of the spindle in a case of performing the machining, from among the post-adjustment control information in the first set; and selecting post-adjustment control information having the shortest cycle time in a case of performing the machining from among the third set, and selects adjustment information corresponding to the post-adjustment control information thus selected as the optimal adjustment information.

6. The control information optimization device according to claim 2, further comprising an optimal adjustment information output means for outputting the optimal adjustment information, in order to adjust the control information according to the optimal adjustment information, and perform the machining.

* * * * *